United States Patent
Harindranath

(10) Patent No.: US 8,655,384 B2
(45) Date of Patent: Feb. 18, 2014

(54) SYSTEM AND METHOD FOR PROVIDING LOCATION BASED REMINDERS

(75) Inventor: Rajmohan Harindranath, Palakkad District (IN)

(73) Assignee: Infosys Limited (IN)

(*) Notice: Subject to any disclaimer, the term of this patent is extended or adjusted under 35 U.S.C. 154(b) by 1014 days.

(21) Appl. No.: 12/702,827

(22) Filed: Feb. 9, 2010

(65) Prior Publication Data

US 2011/0195721 A1 Aug. 11, 2011

(51) Int. Cl.
*H04W 24/00* (2009.01)
*H04M 11/04* (2006.01)

(52) U.S. Cl.
USPC .......... 455/456.3; 455/404.2; 455/422.1; 455/456.1

(58) Field of Classification Search
USPC .......... 370/259; 379/201.01, 201.06, 201.08; 455/403, 404.1, 404.2, 414.1, 421, 455/422.1, 456.1, 456.2, 456.3, 456.5, 455/550.1
See application file for complete search history.

(56) References Cited

U.S. PATENT DOCUMENTS

| | | | |
|---|---|---|---|
| 7,274,299 B2 * | 9/2007 | Osman | 340/686.1 |
| 7,458,184 B2 * | 12/2008 | Lohtia | 455/456.3 |
| 2010/0093371 A1 * | 4/2010 | Gehrke et al. | 455/456.2 |

* cited by examiner

*Primary Examiner* — Anthony Addy
*Assistant Examiner* — Michael S Bush
(74) *Attorney, Agent, or Firm* — Lerner, David, Littenberg, Krumholz & Mentlik, LLP

(57) ABSTRACT

A system and method for providing location based reminder is provided. The method comprises the steps of instructing mobile switching center to remind user on reaching a predetermined location via transaction input; forwarding the transaction input to external short messaging entity via mobile switching center; processing and sending the transaction input to Location Services (LCS) Client to set up change of area event; determining if the change of area event is invoked and user equipment has entered the predetermined location; providing a report to external short messaging entity via LCS Client, if the change of area event is invoked; and directing external short messaging entity to invoke a reminder on user equipment via application server.

23 Claims, 2 Drawing Sheets

SYSTEM AND METHOD FOR PROVIDING LOCATION BASED REMINDERS

BACKGROUND OF THE INVENTION

The present invention relates generally to system and method for location based reminders and more specifically to provide location based services using existing mobile networks.

Time based alarms are often used by users to remind them of tasks that are required to be performed at a predetermined interval of time. Actionable items along with time are stored in the user's device such as mobile phones, handheld devices, personal digital assistants etc. which on a predetermined time, set by the user, flashes the task which needs to be performed.

However, the abovementioned time based alarms are rendered ineffective when the user is travelling and he needs to be reminded of a specific task to be done on reaching a specific location. Very often, the time calculated and fed by the user to a mobile device to alert him on reaching a particular location is not accurate or his travel plans are delayed due to traffic, bad roads etc. which results in confusion and failure in accomplishing predetermined tasks.

In the recent past, GPS enabled devices have been used to detect the location of user to provide location based services. However, these devices and services are very expensive and their reach is not widespread. Further, the abovementioned service is not available in GSM networks which generally cater to most of the mobiles through out the world. In addition, the abovementioned service is available only in high end mobiles thus making the entire proposition quite expensive.

Consequently, there is a need for an efficient system and method for providing cost effective location based reminders. Further, there is a need for a system and method which employs the existing cost effective mobile networks and can provide location based services on low end mobile phones.

BRIEF SUMMARY OF THE INVENTION

A method for providing location based reminder is provided. The method comprises the steps of instructing mobile switching center to remind user on reaching a predetermined location via transaction input, forwarding the transaction input to external short messaging entity via mobile switching center, processing and sending the transaction input to location services (LCS) Client to set up change of area event, determining if the change of area event is invoked and user equipment has entered the predetermined location, providing a report to external short messaging entity via LCS Client to set up change of area event, determining if the change of area event is invoked and user equipment has entered the predetermined location, providing a report to external short messaging entity via LCS Client, if the change of area event is invoked, and directing external short messaging entity to invoke a reminder on user equipment via application server.

In an embodiment of the present invention, the method for providing location based reminder comprises the steps of instructing mobile switching center to remind user on reaching a predetermined location via transaction input, forwarding the transaction input to external short messaging entity via mobile switching center, processing and sending the transaction input to an LCS Client to set up change of area event, determining if the change of area event is invoked and user equipment has entered the predetermined location, determining if the availability of user equipment and periodic/deferred mobile terminated location request is supported, if the change of area event is not invoked, invoking user equipment for periodic/deferred mobile terminated location request via LCS Client, determining if the user equipment has reached the predetermined location, and directing external short messaging entity to invoke a reminder on the user communication device via application server, if the user equipment has reached the predetermined location.

In another embodiment of the present invention, the method providing location based reminder comprises the steps of instructing mobile switching center to remind user on reaching a predetermined location via transaction input, forwarding the transaction input to external short messaging entity via mobile switching center, processing and sending the transaction input to an LCS Client to set up change of area event, determining if the change of area event is invoked and user equipment has entered the predetermined location, determining if the availability of user equipment and periodic/deferred mobile terminated location request is supported, if the change of area event is not invoked, transmitting LCS requests periodically to obtain current location of the user equipment, if the availability of user equipment and periodic/deferred mobile terminated location request is not supported, determining if the user equipment has reached the predetermined location; and directing external short messaging entity to invoke a reminder on the user communication device via application server, if the user equipment has reached the predetermined location.

A system for providing location based reminders is provided. The system comprises a a user equipment for transmitting transaction input and receiving reminders, a mobile switching center for transferring and routing messages, an external short messaging entity for receiving and processing transaction input to generate automated message when a specific event occurs or is expected to occur, a location service client for receiving and forwarding location service area event request from external short messaging entity, a location service server for receiving location service area event request and obtaining location information of one or more user equipments, a visited gateway mobile location center for requesting mobile switching center to provide subscriber location, and an application server for requesting mobile switching center to invoke a call to user equipment once it has reached a predetermined location. The system also comprises a short message service center for storing and forwarding messages received from user equipment.

BRIEF DESCRIPTION OF THE DRAWINGS

The present invention is described by way of embodiments illustrated in the accompanying drawings wherein.

DETAILED DESCRIPTION

A system and method for providing location based reminders for users of mobile devices have been described herein. The invention also provides for usage of existing mobile networks and low end mobile phones to determine user location and send reminders. The method of the invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
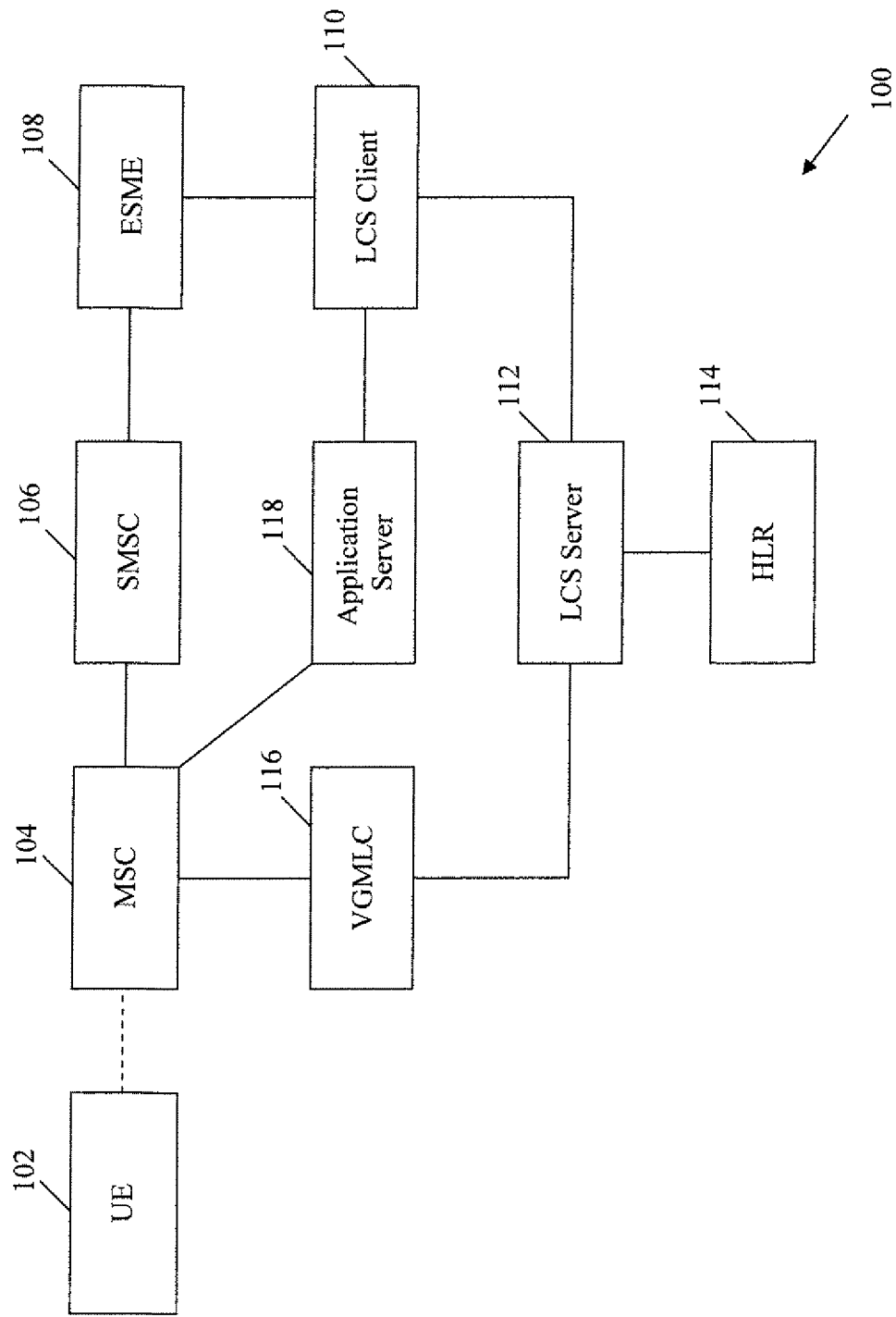
FIG. 1 is a block diagram of a location based reminder system of the present invention.

FIG. 1 illustrates a block diagram of a location based reminder system of the present invention. The location based reminder system 100 comprises user equipment (UE) 102, Mobile Switching Center (MSC) 104, Short Message Service Center (SMSC) 106, External Short Messaging Entity (ESME) 108, Location Services (LCS) client 110, LCS Server 112, Home Location Register (HLR) 114, Visited GMLC (VGMLC) 116, and an application server 118.

UE 102 is a long range, portable electronic device for mobile communication which transmits and receives data and is capable of making and receiving calls. In various embodiments of the present invention, user equipment 102 is a mobile telephone handset however; other portable and hand-held devices such as smart phones, blackberries, personal digital assistants, intelligent mobile devices, intelligent computing device etc. may also be used. In an embodiment of the present invention, the user equipment 102 may be able to transmit and receive data in the form of broadcast or distributed content and visuals, and may also allow peer to peer data and content interchange. In another embodiment of the present invention, the user equipment 102 includes a subscriber identity module (SIM) which connects the user equipment 102 to a service provider or mobile switching center 104. In yet another embodiment of the present invention, UE 102 is used by the user to send reminder message to a predetermined number to enable the location reminder system to send reminder/call on reaching a predetermined location.

The MSC 104 is a network element in the cellular telephony network to which the user equipment is connected. All the routing and transfer of messages take place via MSC 104. The MSC 104 communicates with other distributed elements in the cellular telephony network using industry open standards including but not limited to media gateway control protocol and session initiation protocol. In various embodiments of the present invention, industry standards such as defined by GSM, 3GPP, 3GPP2 etc. are also incorporated by the MSC 104 to communicate effectively with other networking entities. In another embodiment of the present invention, MSC 104 receives reminder messages forwarded by the user for further processing and transfer within the location reminder system 100.

The SMSC 106 is a messaging center which stores and forwards various messages received from UE 102. The SMSC 106 routes SMS messages and regulate the process of transferring messages from UE 102 to other networking elements in the network. In various embodiments of the present invention, when a user sends a text message to another user or another entity, the message gets stored in SMSC 106 and is delivered to the destination user or destination entity when they are available.

The ESME 108 is another external entity in the wireless network that connects SMSC 106 to engage in sending or receiving of messages. In various embodiments of the present invention, ESME 108 is programmed in such a way that it is capable of sending automated message to UE 102 when a specific event occurs or is expected to occur in near future. The messages received at ESME 108 are processed and the relevant information is extracted and dynamic programming is done automatically for triggering specific events. In an embodiment of the present invention, ESME 108 is employed for forwarding LCS Area Event request to LCS Client 110 for a predetermined location. In another embodiment of the present invention, ESME 108 is employed for receiving acknowledgement of LCS Area Event Request from LCS Client when a user enters a predetermined location. Typical examples of ESMEs are systems that send automated marketing messages to mobile phone users, voting systems that process SMS votes etc.

The LCS Client 110 is a software and/or hardware entity that interacts with LCS Server 112 to obtain location information of one or more user equipments. In various embodiments of the present invention, LCS Clients subscribe to location services in order to obtain location information. In an embodiment of the present invention, location services may be considered as a network providing enabling technology having standardized service capabilities which enable the provision of location based applications. These applications may be service provider specific. In another embodiment of the present invention, LCS Client 110 is responsible for formatting and presenting data and managing the user interface. In yet another embodiment of the present invention, LCS Client 110 receives LCS Area Event request from ESME 108 and forwards LCS Service Request to LCS Server 112.

The LCS Server 112 is a software and/or hardware entity offering LCS capabilities. The LCS Server 112 accepts requests, services requests, and sends back responses to the received requests. The LCS server 112 comprises of LCS components, which are distributed to one or more Public Land Mobile Network (PLMN) and/or service provider. The various functions which the LCS Server can handle include, but are not limited to, control function, billing function, operations function, broadcast function, authorization, translation, privacy, control, and resource management functions. Further, LCS Server 112 also interacts with third party database to extract information related to subscribers of HGMLC 108. In various embodiments of the present invention, LCS Server 112 acts as Gateway Mobile Location Center (GMLC).

GMLC is a network device which supports LCS service functionality within a network. GMLCs are referred by different names according to their functionalities and placement in the network. For example, GMLC present in a home network of a UE may be referred to as HGMLC, GMLC present in a visiting network of UE 102 may be referred to as VGMLC, and GMLC receiving LCS requests may be referred to as RGMLC. RGMLC is a first network device that LCS client 110 access in a communication network. RGMLC receives all LCS requests generated by LCS client 104 and acts as a gateway between LCS client 110 and other networking elements in the communication network. HGMLC resides in the home network of UE 102. When LCS client 110 requests for an intimation of change of area event for UE 102, it is forwarded to HGMLC.

LCS Server 112 is further connected to HLR 114 which acts as a central repository for storing details of each mobile phone, subscriber information, subscriber identity module information etc. In an embodiment of the present invention, HLR 114 stores a list of geopolitical names of locations, cell ids and MSCs of communication network. In yet another embodiment of the present invention, the HLR 114 stores routing information pertaining to LCS Service requests for UE 102.

VGMLC 116 is a network entity which serves UE 102 when it roams, enters or stays in a predetermined location for which 'change of area event' is sought. In an exemplary embodiment of the present invention, the VGMLC 116 for UE 102 may be Santa Clara network when home network for UE 102 is San Jose network. In various embodiments of the present invention, 'LCS service request' for reporting 'change of area event' is received by VGMLC 112 of the predetermined location. In an embodiment of the present invention, VGMLC 112 receives the LCS Service Request and location of MSC of the predetermined location which is selected to serve UE 102. In another embodiment of the present invention, VGMLC 112 requests MSC 104 to Provide Subscriber Location (PSL). In yet another embodiment of the present invention, VGMLC also receives from MSC an acknowledgment of PSL request.

Application server 118 is a specialized server that has the key responsibility of running specific applications within the location reminder system of the present invention. It interacts with MSC 104 and LCS Client 110 to generate alarm if the UE has reached predetermined location. In an embodiment of the present invention, the application server receives a invoke call request from LCS Client to application server when an event is detected. In another embodiment of the present invention, the application server requests MSC to invoke a call to UE. In yet another embodiment of the present invention, application server 110 may be a Home Subscriber Server (HSS) or a Service Control Point (SCP).

In operation, UE 102 sends a SMS to MSC 104 that the UE 102 should be alarmed or reminded once it reaches a predetermined location. The MSC 104 then forwards the SMS to SMSC 106 where it is stored and forwarded to ESME 108. The ESME 104 then delivers the SMS to an LCS Client 110 with a request to invoke change of area event as soon as UE 102 enters a predetermined location.

The LCS Client 110 then forwards the LCS Service Request to LCS Server 112. Based on the LCS service request the LCS Server 112 accesses the HLR 114 to determine the address of MSC which serves the UE. The address of MSC is then returned to VGMLC.

The LCS Service request is then forwarded to VGMLC 116. The VGMLC 116 then requests a Provide Subscriber Location (PSL) request to MSC. MSC 114 after receiving the PSL request forwards the LCS Area Event Invoke signal to UE 102.

As soon as UE 102 receives the LCS Area Event Invoke signal, it responds by sending an 'LCS Area Event Invoke' Acknowledgment. The PSL Acknowledgment is then forwarded to VGMLC 116. The VGMLC 116 then forwards the LCS Service Response to LCS Server 112. The LCS Service Response from LCS Server 112 then reaches the LCS Client 110. The LCS Client 110 then sends an 'LCS Area Event' Acknowledgment to ESME 108. ESME 108 then delivers a short message response to SMSC 106. SMSC 106 then sends a delivery report to MSC 104 which then conveys to UE 102 a delivery report confirming that the UE 102 has been registered and would be informed once it reaches a predetermined location.

Now, once UE 102 reaches the predetermined location, UE 102 fires an LCS Area Event Report to MSC 104. MSC 104 then receives the LCS Area Event Report and processes the information and provides with a Subscriber Location Report (SLR) to VGMLC 116. VGMLC 116 responds by sending an acknowledgement signal to MSC 104 and LCS Service Response to LCS Server 112, which in turn forwards the LCS Service Response to LCS Client 110. LCS Client 110 then informs ESME 108 that the event has been detected and automated messages may be delivered. LCS Client 110 then further informs application server 118 to invoke call to UE 102.

Based on the input received by the LCS Client 110, application server 118 invokes call to UE 102 from IP via MSC 104. MSC 104 when receives the call request from application servers 118 sends a reminder or place a call to UE 102 indicating predetermined location has been reached.

Figure 2:
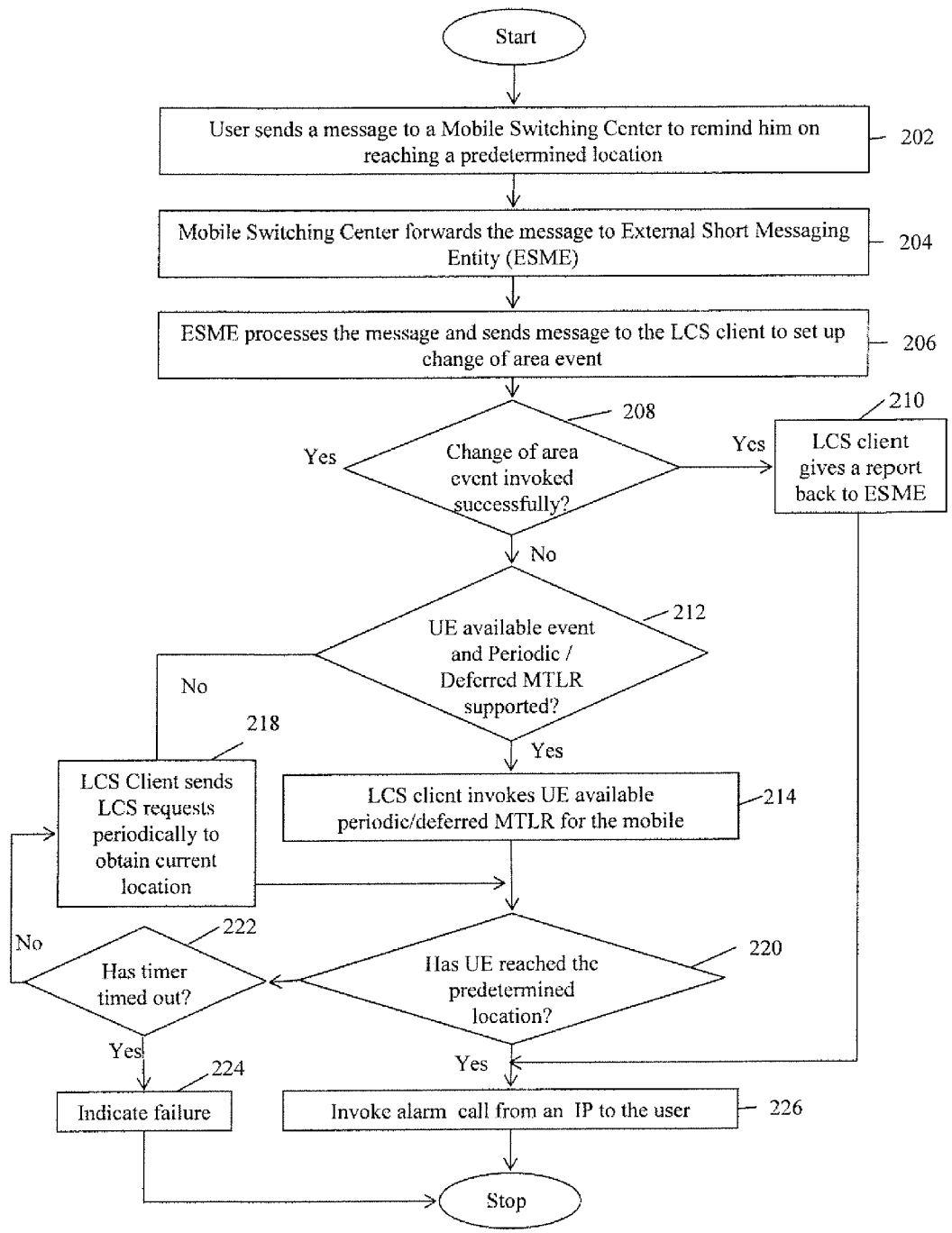
FIG. 2 is a flowchart illustrating a method for invoking location based reminders.

FIG. 2 illustrates a method for invoking a location based reminder employed in the present invention. At step 202, a user provides a transaction input to its service provider indicating that the user should be alarmed or reminded when he reaches a particular destination. In an embodiment of the present invention, the transaction input may be a voice call to a service provider for setting up of alarm. In another embodiment of the present invention, the transaction input may be a single message or multiple messages to register location for setting up of alarm. In yet another embodiment of the present invention, the transaction input may be an unstructured supplementary service data to a predefined number provided by the service provider/mobile switching center offering location based services.

At step 204, the transaction input received by the mobile switching center is forwarded to external short messaging entity. In an embodiment of the present invention, the transaction input is first forwarded from user equipment to short message service center where it is stored and then forwarded to external short messaging entity. In various embodiments of the present invention, external short messaging entity is capable of sending automated messages when a specific event occurs or is expected in near future.

At step 206, external short messaging entity processes the transaction input and sends message to location services client to set up change of area event on the user equipment for a predetermined specific location. In an embodiment of the present invention, the transaction inputs received at external short messaging entity are processed and relevant information is extracted, and dynamic programming is done automatically for triggering specific events.

At step 208, a check is performed to ensure whether the change of area event was invoked successfully. In an embodiment of the present invention, change of area event occurs when user equipment enters a predetermined location and it is reported back to location services client.

If it is ascertained that the change of area event was invoked successfully then at step 210, location services client gives a report back to external short messaging entity. In an embodiment of the present invention, the report may include various details such as time of entry of user equipment at the predetermined location, identity of cells in which the user equipment has entered, address of mobile switching center, address of home gateway location center, address of new mobile switching centers which can serve user equipment etc.

At step 226, based on the report provided to external short messaging entity, the external short messaging entity directs application server to invoke call to user equipment from an IP to the user. In an embodiment of the present invention, application server directs the mobile switching center to deliver a message or place a call to user equipment indicating that the predetermined location has been reached.

If it is ascertained that the change of area event was not invoked successfully, then at step 212, a check is performed to ensure if 'UE Available Event and Periodic/Deferred Mobile Terminated Location Request' is supported. In an embodiment of the present invention, LCS Client sends a LOS Service request to obtain the current location of user equipment and then computes the difference in distance between current location and target location. In another embodiment of the present invention, the difference is then used to compute the periodicity of location requests to be sent. In an exemplary embodiment of the present invention, if the distance between the current location and target area is 400 kilometers, it is assumed that the distance shall not be covered within 30 minutes. Therefore, a location report after every 30 minutes would be appropriate. In another embodiment of the present invention, LCS Client may decrease the time period of location report if the user equipment has reached close to the target predetermined location.

If it is ascertained that 'UE Available Event and Periodic/Deferred Mobile Terminated Location Request' is supported then at step 214, location services client invokes the UE Available Periodic Deferred Mobile Terminated Location Request for the user's mobile phone/user equipment. In an embodiment of the present invention, LCS Client sends LCS requests periodically to obtain current location of user equipment.

If it is ascertained that 'UE Available Event and Periodic/Deferred Mobile Terminated Location Request' is not supported then at step 218, LCS Client sends LCS requests periodically to obtain current location.

At step 220, another check is performed to ensure if the user equipment has reached the predetermined location. If it is ascertained that the UE has not reached the predetermined location, then at step 222 a check is performed to ensure whether a timer has timed out. If the timer has not timed out, then the control is transferred to step 218. If the timer has timed out, then at step 224, mobile switching center sends a message indicating a failure of invocation of reminder for UE. If it is ascertained that UE has reached the predetermined location, then at step 224, application server invokes a call to user equipment from an IP to the user. In an embodiment of the present invention, application server directs the mobile switching center to deliver a message or place a call to user equipment indicating that the predetermined location has been reached.

The present invention may be implemented in numerous ways including as a system, a method, or a computer readable medium such as a computer readable storage medium or a computer network wherein programming instructions are communicated from a remote location.

The system, method and computer program product for providing location based reminders as described herein is particularly well suited for portable mobile devices and services, however, may be applied to various location based reminders in other domains by performing minor modifications as would be apparent to a person of skill in the art.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

The invention claimed is:

1. A method for providing location based reminder, the method comprising the steps of
   instructing mobile switching center to remind user on reaching a predetermined location via transaction input;
   forwarding the transaction input to external short messaging entity via mobile switching center;
   processing and sending the transaction input to location services (LCS) client to set up change of area event;
   determining if the change of area event is invoked and user equipment has entered the predetermined location;
   if the change of area event is invoked, providing a report to external short messaging entity via LCS client;
   if the change of area is not invoked, determining if availability of user equipment and periodic/deferred mobile terminal location request is supported;
   if the availability of user equipment and periodic/deferred mobile terminated location request is supported, invoking the user equipment for periodic/deferred mobile terminated location request via LCS client;
   determining if the user equipment has reached the predetermined location;
   directing external short messaging entity to invoke a reminder on user equipment via application server, if the user equipment has reached the predetermined location;
   determining if a timer has timed out; and
   sending a message indicating a failure of invocation of reminder via the mobile switching center, when the change of area is not invoked and the time has timed out.

2. The method as claimed in claim 1, wherein the transaction input may comprise a Short Message Service (SMS), a voice call, or an unstructured supplementary service data (USSD).

3. The method as claimed in claim 1, wherein the user equipment may be a mobile telephone handset, hand held device, a personal digital assistant, intelligent computing device, or electronic communication device.

4. The method as claimed in claim 1, wherein the user equipment includes a subscriber identity module (SIM) which connects user equipment to a service provider.

5. The method as claimed in claim 1, wherein external short messaging entity is capable of sending automated message when a specific event occurs or is expected to occur in near future.

6. The method as claimed in claim 1, wherein LCS Client is a software and/or hardware entity that interacts with LCS Server to obtain location information of one or more user equipments.

7. The method as claimed in claim 1, wherein LCS Server is a software and/or hardware entity offering LCS capabilities.

8. The method as claimed in claim 1, wherein LCS Server is connected to home location register which acts as a central repository for storing information including details of each mobile phone, subscriber information, and subscriber identity module information.

9. The method as claimed in claim 1, further comprising a network entity Visited Gateway Mobile Location Center (VGMLC), which serves user equipment when it roams, enters or stays in a predetermined location for which change of area event is sought.

10. The method as claimed in claim 1, wherein application server interacts with MSC and LCS Client to generate alarm if the user equipment has reached predetermined location.

11. A method for providing location based reminder, the method comprising the steps of
    instructing mobile switching center to remind user on reaching a predetermined location via transaction input;
    forwarding the transaction input to external short messaging entity via mobile switching center;
    processing and sending the transaction input to Location Services (LCS) Client to set up change of area event;
    determining if the change of area event is invoked and user equipment has entered the predetermined location;
    determining if a timer has timed out;

determining if the availability of user equipment and periodic/deferred mobile terminated location request is supported, if the change of area event is not invoked;

invoking user equipment for periodic/deferred mobile terminated location request via LCS Client, if the availability of user equipment and periodic/deferred mobile terminated location request is supported;

determining if the user equipment has reached the predetermined location;

directing external short messaging entity to invoke a reminder on the user communication device via application server, if the user equipment has reached the predetermined location; and sending a message indicating a failure of invocation of reminder via the mobile switching center, when the change of area event is not invoked and the timer has timed out.

12. A method for providing location based reminder, the method comprising the steps of:

instructing mobile switching center to remind user on reaching a predetermined location via transaction input;

forwarding the transaction input to external short messaging entity via mobile switching center;

processing and sending the transaction input to Location Services (LCS) Client to set up change of area event;

determining if the change of area event is invoked and user equipment has entered the predetermined location;

determining if a timer has timed out;

determining if the availability of user equipment and periodic/deferred mobile terminated location request is supported, if the change of area event is not invoked;

transmitting LCS requests periodically to obtain current location of the user equipment, if the availability of user equipment and periodic/deferred mobile terminated location request is not supported;

determining if the user equipment has reached the predetermined location;

directing external short messaging entity to invoke a reminder on the user communication device via application server, if the user equipment has reached the predetermined location; and sending a message indicating a failure of invocation of reminder via the mobile switching center, when the change of area event is not invoked and the timer has timed out.

13. A system for providing location based reminders, the system comprising:

a user equipment for transmitting transaction input and receiving reminders;

a mobile switching center for transferring and routing messages;

an external short messaging entity for receiving and processing transaction input to generate automated message when a specific event occurs or is expected to occur;

wherein, if the specific event does not occur, availability of user equipment and periodic/deferred mobile terminated location request support is determined;

a timer;

a Location Services (LCS) Client for receiving and forwarding location service area event request from external short messaging entity;

wherein, the LCS Client transmits LCS requests periodically to obtain a current location information of the one or more user equipment, if the availability of user equipment and periodic/deferred mobile terminated location request is not supported; and an LCS Server for receiving location service area event request and obtaining the current location information of the one or more user equipments;

a visited gateway mobile location center for requesting mobile switching center to provide subscriber location; and an application server for requesting mobile switching center to invoke a call to user equipment once it has reached a predetermined location, wherein, the mobile switching center is configured to send a message indicating a failure of invocation of reminder, when the specific event does not occur and the timer has timed out.

14. The system as claimed in claim 13 further comprising a short message service center for storing and forwarding messages received from user equipment.

15. The system as claimed in claim 13, wherein the transaction input may comprise a Short Message Service (SMS), a voice call, or an unstructured supplementary service data (USSD).

16. The system as claimed in claim 13, wherein the user equipment may be a mobile telephone handset, hand held device, a personal digital assistant, intelligent computing device, or electronic communication device.

17. The system as claimed in claim 13, wherein the user equipment includes a subscriber identity module (SIM) which connects user equipment to a service provider.

18. The system as claimed in claim 13, wherein external short messaging entity is capable of sending automated message when a specific event occurs or is expected to occur in near future.

19. The system as claimed in claim 13, wherein LCS Client is a software and/or hardware entity that interacts with LCS Server to obtain location information of one or more user equipments.

20. The system as claimed in claim 13, wherein LCS Server is a software and/or hardware entity offering LCS capabilities.

21. The system as claimed in claim 13, wherein LCS Server is connected to home location register which acts as a central repository for storing details of each mobile phone, subscriber information, and subscriber identity module information.

22. The system as claimed in claim 13, further comprising a network entity Visited Gateway Mobile Location Center (VGMLC), which serves user equipment when it roams, enters or stays in a predetermined location for which change of area event is sought.

23. The system as claimed in claim 13, wherein application server interacts with MSC and LCS Client to generate alarm if the user equipment has reached predetermined location.

* * * * *